(12) United States Patent
Hartung

(10) Patent No.: US 10,623,658 B2
(45) Date of Patent: Apr. 14, 2020

(54) RETURN DEVICE FOR EMPTIES

(71) Applicant: Wincor Nixdorf International GmbH, Paderborn (DE)

(72) Inventor: Domenic Hartung, Molsdorf (DE)

(73) Assignee: Wincor Nixdorf International GmbH, Paderborn (DE)

( * ) Notice: Subject to any disclaimer, the term of this patent is extended or adjusted under 35 U.S.C. 154(b) by 330 days.

(21) Appl. No.: 15/438,800

(22) Filed: Feb. 22, 2017

(65) Prior Publication Data
US 2017/0244905 A1    Aug. 24, 2017

(30) Foreign Application Priority Data

Feb. 22, 2016    (EP) .................................. 16 156 685

(51) Int. Cl.
*H04N 5/247*    (2006.01)
*G07F 7/06*    (2006.01)
(Continued)

(52) U.S. Cl.
CPC .............. *H04N 5/247* (2013.01); *G07F 7/06* (2013.01); *G07F 7/0609* (2013.01);
(Continued)

(58) Field of Classification Search
CPC ..................................................... H04N 5/247
(Continued)

(56) References Cited

U.S. PATENT DOCUMENTS 5,237,404 A * 8/1993 Tanaka ................. G01B 11/303
                                                        348/128
6,137,900 A    10/2000 Steidel et al.
(Continued)

FOREIGN PATENT DOCUMENTS

DE    19508388 A1    9/1996
EP    2256701 A2    12/2010
(Continued)

OTHER PUBLICATIONS

European Search Report based on application No. 16156685.6 (9 pages) dated Jul. 5, 2016 (for reference purpose only).
(Continued)

*Primary Examiner* — Eileen M Adams
*Assistant Examiner* — Daniel T Tekle
(74) *Attorney, Agent, or Firm* — Black, McCuskey, Souers & Arbaugh LPA

(57) ABSTRACT

A return device for empties includes an optical capturing apparatus for optically capturing features of an empty container. The capturing apparatus includes light sources and cameras. The light sources and the cameras are arranged around a capturing region in a horseshoe-shaped manner. One of the light sources and one of the cameras are arranged such that the camera is arranged in the beam path of the light source such that, when an empty container has been brought into a capturing region, the camera captures a modified luminous energy from the light source compared to the case where there are no empty containers in the capturing region. The return device further includes a circuit connected to the plurality of cameras and configured to activate an additional camera or an additional light source of the light sources on the basis of the luminous energy captured by the camera.

14 Claims, 11 Drawing Sheets

(51) Int. Cl.
 H04N 5/225 (2006.01)
 H04N 5/232 (2006.01)
(52) U.S. Cl.
 CPC ....... *H04N 5/2256* (2013.01); *H04N 5/23203* (2013.01); *H04N 5/23229* (2013.01)
(58) Field of Classification Search
 USPC ........................................................ 348/159
 See application file for complete search history.

(56) References Cited

U.S. PATENT DOCUMENTS

2010/0290767 A1    11/2010  Lunde
2014/0218510 A1*   8/2014   Nordbryhn ........... G07F 7/0609
                                                         348/131

FOREIGN PATENT DOCUMENTS

EP      2538392 A1    12/2012
WO   2009021515 A1     2/2009

OTHER PUBLICATIONS

European Office Action filed in the corresponding European Application; 8 pages.

* cited by examiner

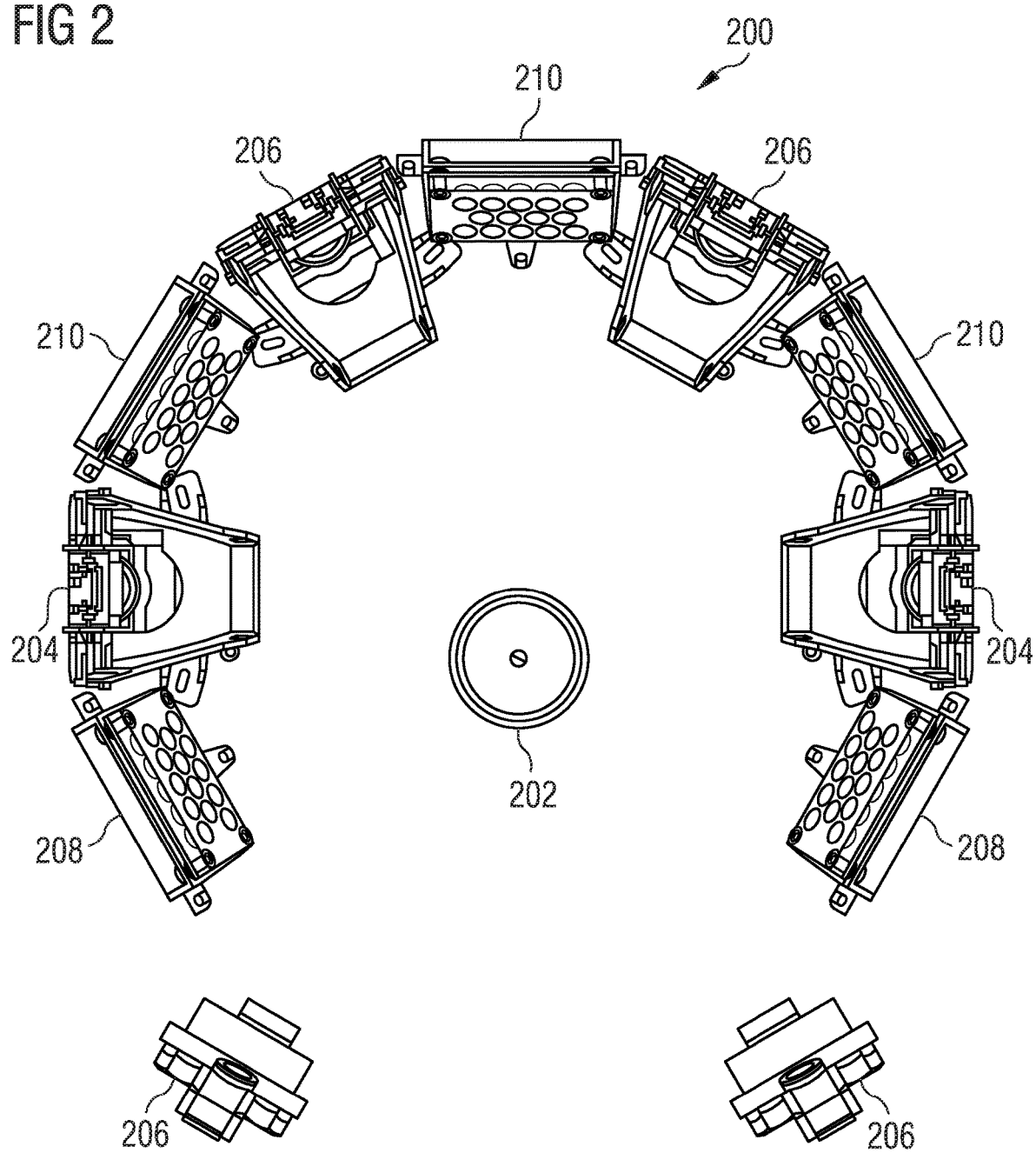

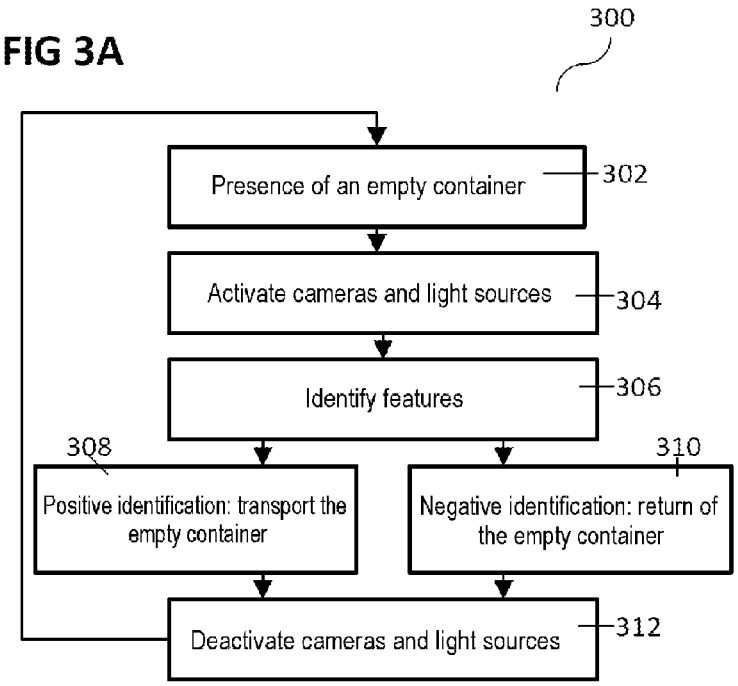
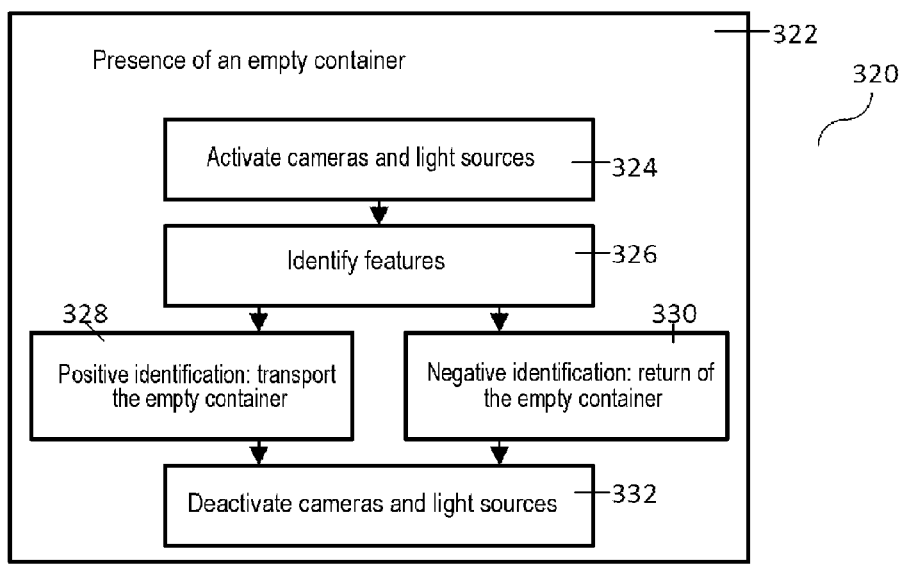

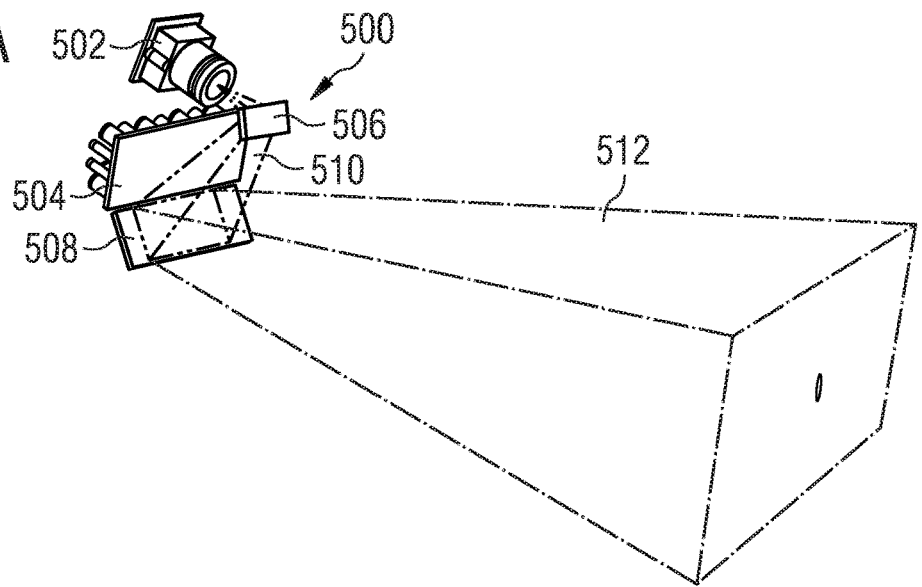
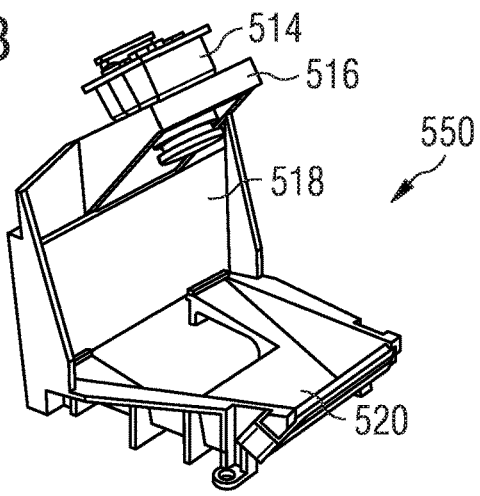
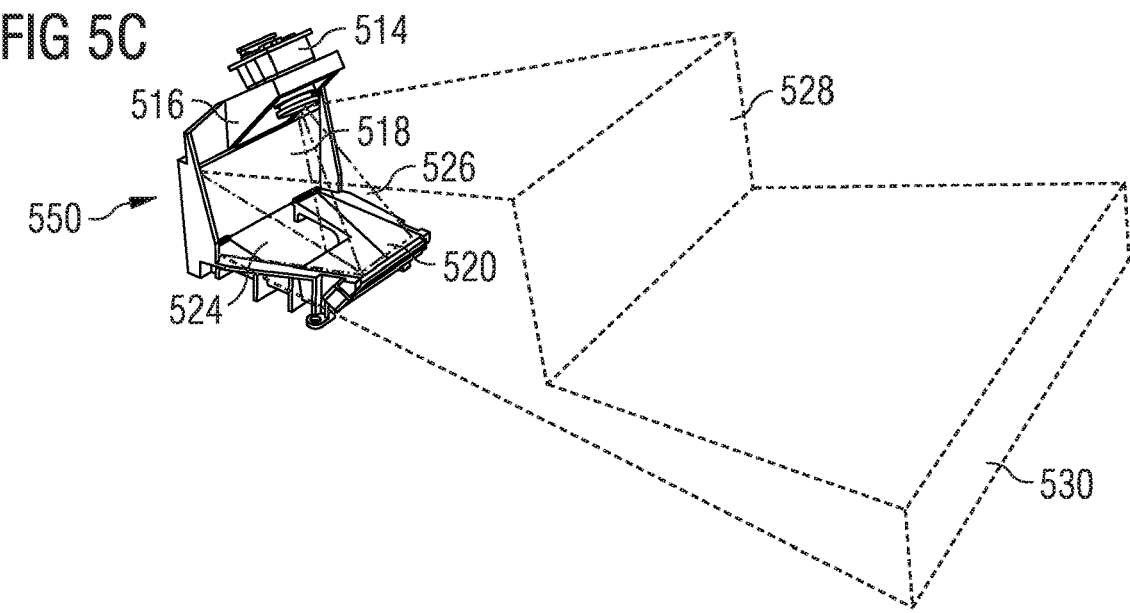

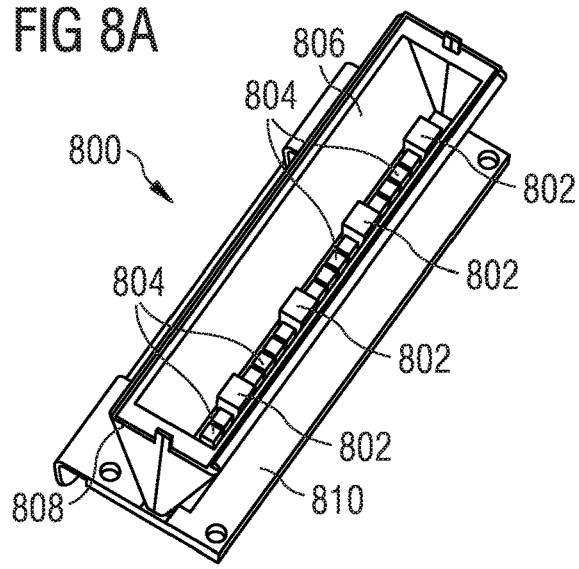
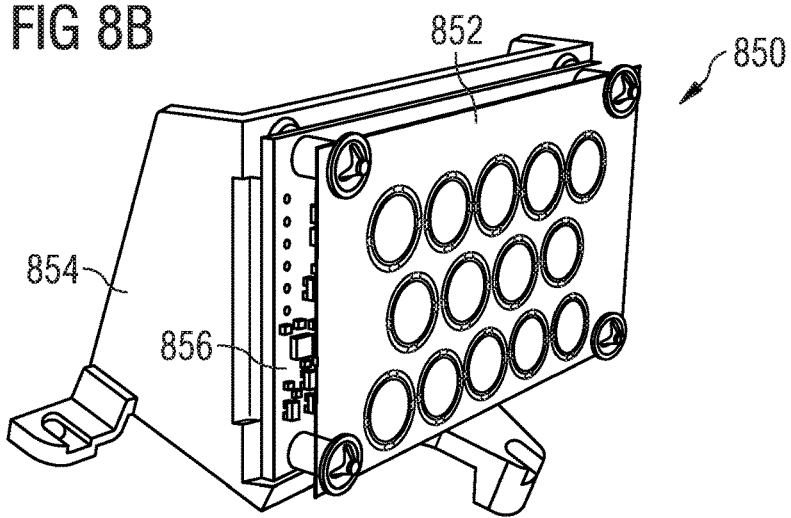
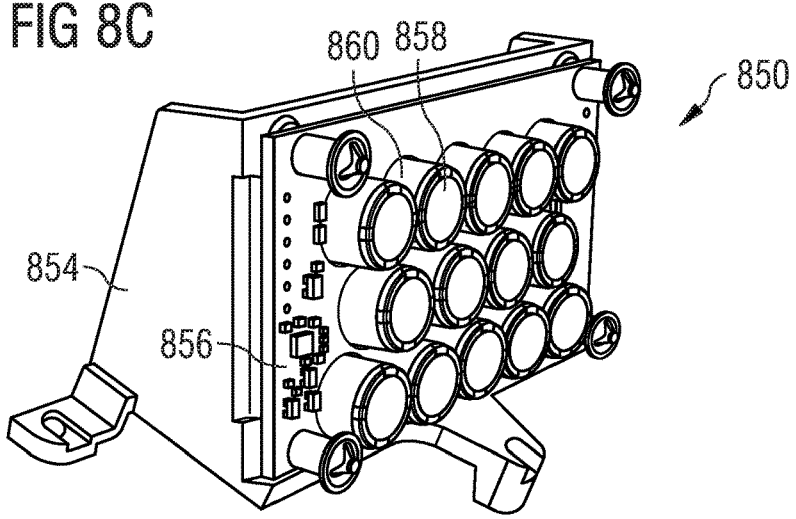

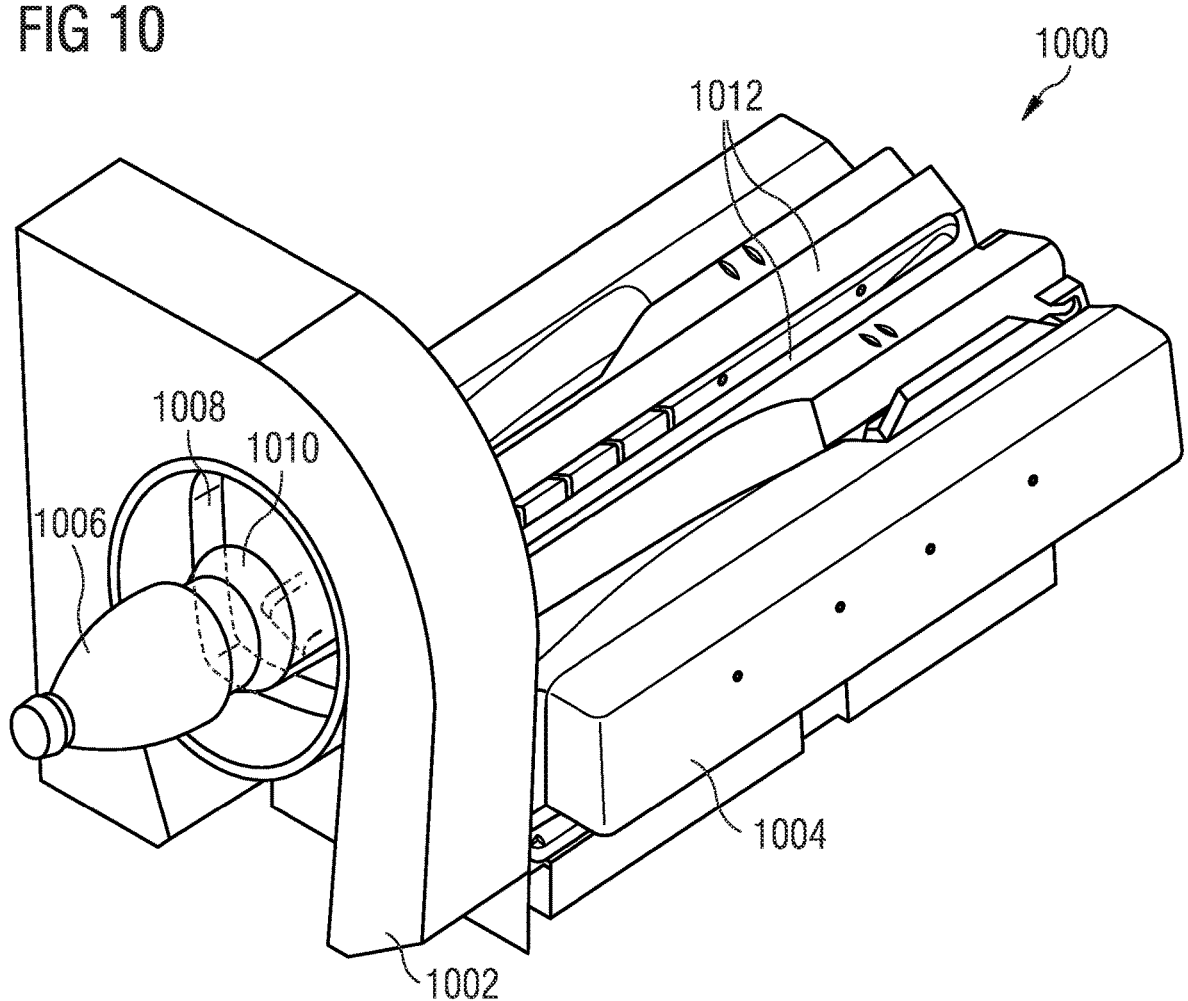

RETURN DEVICE FOR EMPTIES

CROSS-REFERENCE TO RELATED APPLICATION

This application claims priority to European Patent Application Serial No. 16 156 685.6, which was filed Feb. 22, 2016, and is incorporated herein by reference in its entirety.

TECHNICAL FIELD

The present disclosure relates to a return device for empties.

BACKGROUND

By way of example, a return device for empties is used in stores to allow customers to return bottles and tins with as little staff outlay as possible. An empty container may be associated with a deposit. To this end, the empty container or the type thereof is to be correctly identified and captured.

Return devices for empties in which an empty container is captured and identified by means of, for example, a barcode scanner are known. The empty container is rotated (along the longitudinal axis thereof) by means of a rotation device of a transporting apparatus until a barcode situated on the empty container is able to be read by the barcode scanner. This rotation process may be time-consuming, particularly in the case of many empty containers. Further, the empty container may be dirtied, for example on account of a dirty rotation device, and may no longer be captured or no longer be captured correctly.

Further, a conventional return device for empties which, for example, is fully active for many hours every day in store may have a correspondingly high power consumption.

Identifying and capturing an empty container should ensure that the inserted empty container is counted correctly and, for example, cannot be improperly removed again after the capture and reinserted.

SUMMARY

A return device for empties includes an optical capturing apparatus for optically capturing features of an empty container. The capturing apparatus includes light sources and cameras. The light sources and the cameras are arranged around a capturing region in a horseshoe-shaped manner. One of the light sources and one of the cameras are arranged such that the camera is arranged in the beam path of the light source such that, when an empty container has been brought into a capturing region, the camera captures a modified luminous energy from the light source compared to the case where there are no empty containers in the capturing region. The return device further includes a circuit connected to the plurality of cameras and configured to activate an additional camera or an additional light source of the light sources on the basis of the luminous energy captured by the camera.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 2 shows a view of a capturing apparatus in accordance with various embodiments;

FIGS. 3A and 3B show procedures for returning an empty container;

FIGS. 5A to 5C show each show a camera system;

FIGS. 8A to 8C show each show a view of a light source system;

FIG. 10 shows part of a return device for empties; and

DESCRIPTION

Figure 1:
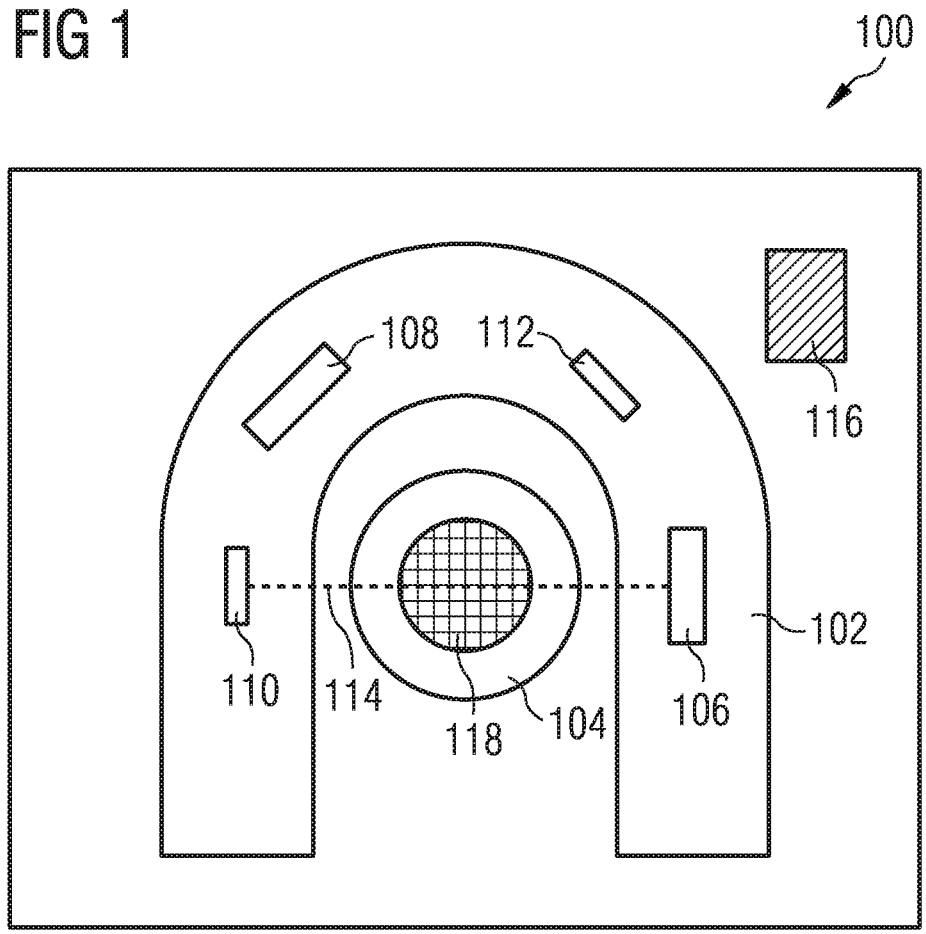
FIG. 1 shows a view of a return device for empties in accordance with various embodiments.

In the following detailed description, reference is made to the accompanying drawings, which form part of this description and show for illustration purposes specific embodiments in which the invention can be implemented. In this regard, direction terminology such as, for instance, "at the top", "at the bottom", "at the front", "at the back", "front", "rear", etc. is used with respect to the orientation of the figure(s) described. Since component parts of embodiments can be positioned in a number of different orientations, the direction terminology serves for illustration and is not restrictive in any way whatsoever. It goes without saying that other embodiments can be used and structural or logical changes can be made, without departing from the scope of protection of the present invention. It goes without saying that the features of the various embodiments described herein can be combined with one another, unless specifically indicated otherwise. Therefore, the following detailed description should not be interpreted in a restrictive sense, and the scope of protection of the present invention is defined by the appended claims.

In the context of this description, the terms "linked", "connected" and "coupled" are used to describe both a direct and an indirect link, a direct or indirect connection and a direct or indirect coupling. In the figures, identical or similar elements are provided with identical reference signs, insofar as this is expedient.

Ostensively, a return device for empties which includes an apparatus for optically capturing one or more features of an empty container is provided in various embodiments. To this end, a plurality of cameras and a plurality of light sources are arranged along a horseshoe shape, with said cameras and light sources being arranged around a capturing region in which an empty container may be identified and one or more features of the empty container may be captured. The arrangement in the form of a horseshoe facilitates the empty container being able to be examined simultaneously all the way around in respect of one or more features in one section of the surface of the empty container, and so no rotation of the empty container is necessary. The opening in the horseshoe-shape is substantially aligned in the direction of the base of the return device for empties. The plurality of light sources lift the general lighting level for the cameras and at least one light source of the plurality of light sources also acts as an optical sensor together with at least one camera of the plurality of cameras and a circuit, said sensor being able to identify the presence of an empty container. The circuit is configured in such a way that, should the presence of an empty container be identified (for example if the luminous energy received by means of the camera is less than a predetermined threshold), the remaining ones of the plurality of cameras and/or plurality of light sources are activated, at least in part. Further, the return device for empties may include a processor which is configured to ascertain the features of the empty container, for example optical features which were captured by means of the camera and were transmitted to the processor from said camera.

A return device for empties may include an optical capturing apparatus for optically capturing features of an empty container. The capturing apparatus may include: a plurality of light sources and a plurality of cameras; wherein the plurality of light sources and the plurality of cameras may be arranged around a capturing region in a horseshoe-shaped manner, with the empty container being able to be brought into said capturing region for the purposes of optically capturing the features; wherein at least one of the plurality of light sources and at least one of the plurality of cameras may be arranged in such a way that the at least one camera may be arranged in the beam path of the at least one light source such that, when an empty container has been brought into the capturing region, the at least one camera may capture a modified luminous energy from the at least one light source compared to the case where there are no empty containers in the capturing region. The return device for empties may further include a circuit which may be connected to the plurality of cameras and configured to activate at least one additional camera of the plurality of cameras and/or at least one additional light source of the plurality of light sources on the basis of the luminous energy captured by means of the at least one camera.

By way of example, the return device for empties may be an automatic machine which, with little staff outlay, identifies and captures and accepts empty containers and, for example, outputs a deposit coupon to a user on the basis of an ascertained deposit of the empty container for one or more empty containers. By way of example, an empty container may be inserted into a capturing region of the return device for empties. As soon as the presence of the empty container is identified, the return device for empties, for example the capturing apparatus, may be configured to capture the features of the empty container. If the empty container (e.g. the type, group or category thereof) is identified as an empty container anticipated to be returned, the empty container may be transported, for example to a storage space, by means of a transporting apparatus of the return device for empties, for example to a bottle table or else a compactor.

By way of example, the return device for empties may contain a transporting apparatus including one or more transporting belts, which are able to transport one or more empty containers within the return device for empties.

The return device for empties may be configured to count one or more empty containers inserted in succession, said empty containers having been ascertained in terms of the type, group or category thereof and having been accepted, and, on the basis thereof, e.g. add the respective deposits, wherein a deposit may be associated with a respective empty container in each case, and print out a deposit coupon, e.g. when demanded by a user.

By way of example, the return device for empties may be linked to a computer, a network or any other one or more processors external to the return device for empties, which facilitate monitoring of the status of the return device for empties.

By way of example, an empty container may be a bottle, a tin or any other container. By way of example, it may be configured to transport water, lemonade, juice, wine or beer. By way of example, an empty container may consist of metal, plastic or glass. The type, kind, group and category (each possibly with a plurality of sub-types, sub-groups and sub-categories) of an empty container may be understood to mean that the empty container may be captured and categorized according to e.g. properties and features such as type, material, size, form, (erstwhile) content, producer, brand, amount of residual liquid, degree of dirtying, degree of damage, identity or identity of a group of further properties.

An empty container may have various, i.e. one or more, features. A feature may be present as a combination of a plurality of features. Features may be optical features which, for example, may be printed onto the empty container and/or introduced into the empty container, for example in the form of a punch or a depression. Further examples of features or carriers of features are one or more barcodes, QR codes and labels.

The capturing apparatus may be configured to identify the presence of an empty container and capture one or more features (e.g. optical features) of the empty container. The type of empty container and/or the group, kind, identity or category thereof may be ascertained by means of the captured features. By comparing one or more features stored in a database (the database may, in part or in full, be part of the return device for empties or, in part or in full, be provided at a distance from the return device for empties and coupled therewith by means of one or more (wireless or wired) communication networks) with the one or more captured features of the empty container, the empty container may be accepted or not accepted, depending on the result of the comparison.

One or more light sources of the plurality of light source may include or be a plurality of light sub-sources. By way of example, a light source may include a plurality of light-emitting diodes. The plurality of light sources/light sub-sources may be different from one another, wherein a plurality of light sources/light sub-sources may be grouped to form individual groups, for example groups which, overall, supply a predetermined luminous energy and/or colour of light.

By way of example, the plurality of light sources/light sub-sources may be configured to emit light in different spectral regions. By way of example, a plurality of different light sources/light sub-sources may be controlled or regulated independently of one another. By way of example, controlling or regulating may be carried out by means of circuitry and/or a processor. By way of example, the plurality of cameras may act as an optical sensor in order to supply data for controlling or regulating purposes.

One or more light sources/light sub-sources may satisfy a plurality of different functions. By way of example, the lighting level in the capturing region may be increased, which may allow the plurality of cameras to capture one or more features of an empty container. By way of example, a desired contrast ratio for the images captured by the plurality of cameras may be realized. Further, an optical sensor may be provided by means of at least one camera of the plurality of cameras and at least one light source/light sub-source and the circuit for the purposes of capturing the presence of an empty container.

The plurality of light sources/light sub-sources may be configured to emit light in different spectral regions. By way of example, a light source/light sub-source may be configured to emit visible light, infrared light or ultraviolet light. By way of example, capturing a feature of an empty container by means of light from such a spectral region may be facilitated. The plurality of cameras may be configured accordingly in order to capture, at least in part, these spectral regions.

One or more light sources/light sub-sources may be actuated in such a way that they produce pulsed light (by way of example, the circuit may be configured to actuate the one or more light sources/light sub-sources in such a way that they produce pulsed light). By way of example, the duration of a pulse may be approximately 0.1 ms to 10 ms, for example 0.5 ms to 5 ms, for example approximately 1 ms. The time interval between pulses may be e.g. 1 ms to 1000 ms, for example 5 ms to 100 ms. Ostensively, the pulses may act as a "flash" for the plurality of cameras for recording an image in each case. The pulsed operation may offer the effect of a lower power consumption when compared with a permanent, non-pulsed operation. By way of example, a lower power consumption may mean that less waste heat is produced and hence less outlay may be required for cooling/ventilating a return device for empties. Further, the number of arising images, the power consumption, the ease of maintenance (for example on account of wear on a light source) and further factors may be influenced, by means of e.g. the time intervals between the pulses and e.g. assigned recordings of images by means of the plurality of cameras.

The plurality of light sources/light sub-sources may include one or more optical components, such as e.g. windows, diffusers, reflectors, lenses or mirrors. As a result, light may be emitted diffusely, for example for increasing the lighting level in the capturing region, and/or in a directed fashion, for example for identifying the presence of an empty container.

By way of example, one or more cameras of the plurality of cameras may be configured to capture one or more individual images and/or one or more video images. The plurality of cameras may differ from one another. By way of example, one camera may be configured for capturing images in colour, greyscale or in black and white, or else in infrared or combinations thereof. A camera may have one or more items of circuitry, for example circuitry for an autofocus. By way of example, additional circuitry may be configured to prepare captured image data and/or buffer store image data. Furthermore, a camera may include optical components, such as e.g. windows, mirrors or lens systems, in order, for example, to set a focal plane.

At least two cameras may be present in order to capture at least a portion of a surface of an empty container. More than two cameras may be arranged along the circumference of the capturing region, i.e. along the horseshoe shape, in such a way that the respective recording regions of the cameras overlap, as a result of which it becomes possible to record, and then also process, a larger region of the surface of the empty container by stitching together images of a plurality of cameras compared to what would be possible using a single camera, or else two cameras lying opposite one another.

A camera may be part of a camera system which may have e.g. one or more reflecting surfaces, for example a mirror or a reflecting film. The beam path to the camera or the recording region of the camera may be modified by means of one or more reflecting surfaces in such a way that the focal plane of the camera is displaced and hence it is possible to shorten the spatial distance between the camera and the object to be recorded, for example an empty container. By way of example, different cameras may be part of different camera systems. By way of example, a plurality of cameras along a horseshoe-shaped capturing apparatus may be part of different camera systems, depending on the distance from a capturing region. Further, the camera systems may have holders for one or more cameras, which holders may be configured to modify the position of the one or more cameras in order, for example, to set or adjust the recording region or the focal plane of the one or more cameras.

The plurality of cameras may be coupled to a processor and may be configured to provide a captured individual image/captured video images to this processor. The data received by the processor from one or more cameras may contain both image data and, for example, further information, e.g. data for identifying a respective camera and/or a timestamp relating to e.g. when one or more images were recorded.

A camera of the plurality of cameras and a light source of the plurality of light sources may in each case be assigned to one another in a pairwise manner. Pairwise within this meaning also includes configurations in which a light source is assigned to a plurality of cameras and/or a camera is assigned to a plurality of light sources. This assignment may be such that the beam path between one or more light sources and one of the plurality of cameras is modified on account of an empty container being introduced into the capturing region and a modified luminous energy from one or more light sources/light sub-sources is incident on a camera. By way of example, the beam path may be modified by virtue of the light being at least partly blocked by the empty container or a camera receiving more light on account of a reflection at an empty container. One or more mirror and/or lens systems may be arranged between the plurality of light sources and the plurality of cameras and may define the beam path.

By way of example, one or more cameras may be part of one or more camera systems with reflecting surfaces. One or more light sources may be configured in such a way that light from the one light source or the plurality of light sources is emitted to the reflecting surface and reflected to a camera from there. Hence, light from a light source e.g. may pass the capturing region of a return device for empties twice or multiple times before it is received by a camera. By way of example, this may be advantageous if an empty container is virtually transparent (for example with a transmission greater than 90%), since a plurality of passages of light through the empty container supply an increased change in the luminous energy and hence a clearer signal for the presence of the empty container in the capturing region. Further, a larger volume of the capturing region may be illuminated by a plurality of mutually different, e.g. spatially offset, passages of light through a capturing region. Hence, for example, the presence of an empty container which is relatively small in relation to the volume of the capturing region may be identified using only one or a few light sources.

The horseshoe-shaped arrangement of the plurality of light sources and the plurality of cameras may be such that a section of the surface of an empty container in the capturing region, which for example leads through 360° around the surface of the empty container, may be captured in its entirety at the same time. For this purpose, a spacing may be provided between the capturing apparatus and other elements of the return device for empties, for example the transporting system, such that the plurality of light sources and the plurality of cameras are able to illuminate or capture the surface of the empty container, at least in sections.

Here, the horseshoe-shaped arrangement may be e.g. u-shaped or v-shaped, or correspond e.g. to an interrupted circle. The opening of the horseshoe shape may be aligned substantially in the direction of the base of the return device for empties. The opening of the horseshoe shape, for example realized as a break in a circular shape, may serve to provide space for other elements, such as e.g. a transporting system. Furthermore, this arrangement prevents residual liquids still contained in the empty containers or other dirtying of the empty containers from falling onto a camera or a light source and dirtying the latter.

A processor may be configured to receive and process recorded images from one or more cameras. Here, the processor may be configured to stitch together the recorded images from a plurality of cameras so as to form an overall image. By way of example, the processor may be part of a computer or part of a plurality of networked computers.

By way of example, by means of hardware and software, for example by means of a video memory, a GPU (graphics processing unit), image detection and image processing programs, the processor may be configured to ascertain the one or more features of an empty container. The processor may be configured to compare the one or more captured features with features stored in a memory (e.g. a database). The (e.g. optical) feature or features characterizing the respective types of empty containers may be stored in the database for different types of empty containers. Furthermore, whether this type of empty container should or should not be accepted by the respective return device for empties may be stored in the database in respect of the respective type of empty container. However, provision may also be made for the inserted empty container not to be accepted by the return device for empties in the case where the processor does not find any type of empty container for the ascertained optical features. Expressed differently, the empty container may or may not be accepted by the return device for empties, depending on the result of the comparison, and the processor may be configured to provide this information to other parts of the return device for empties or appropriately control the latter, for example a transporting device for transporting the empty container (by way of example, the transporting device may be actuated in such a way that the inserted empty container is transported back to the user and returned to him again).

The processor may be activated or deactivated. By way of example, the processor may be activated or deactivated with one or more cameras and/or with one or more light sources by means of the circuit. An activated or deactivated processor may be understood to mean that the processor is able (activated) or else not able (not activated) to undertake the process of ascertaining one or more features of an empty container (expressed differently, to carry out image processing of images supplied to it by the cameras or to even receive the images). By way of example, activating and deactivating may mean that the processor or parts of the processor is/are switched on or off, or that the processor or parts of the processor is/are put into a sleep mode, such as e.g. a standby mode. Further, this may mean that software running on the processor is executed or stopped. Hence, the power consumption of the processor, and hence of the entire return device for empties, may be reduced whenever the processor is deactivated. By way of example, it is possible only to deactivate the one or more parts of the processor which are configured for capturing an empty container but, for example, data interchange with other systems may remain or may continue to be possible.

The circuit may be part of the processor, part of the capturing apparatus or a dedicated element. The circuit may be configured to activate or deactivate one or more cameras and/or one or more light sources. The circuit may be configured to predetermine pulsation (e.g. duration, shape and interval between pulses) for one or more light sources and/or intervals between individual images being recorded by one or more cameras. The circuit may be configured to activate or deactivate the processor or part of the processor. Together with at least one camera and at least one light source/light sub-source, the circuit may represent an optical sensor for detecting the presence of an empty container.

According to various embodiments, the return device for empties may further include a processor for processing image signals captured by means of the plurality of cameras.

According to various embodiments, the return device for empties may be configured to activate the processor on the basis of the luminous energy captured by means of the plurality of cameras.

According to various embodiments, the plurality of cameras may be configured to capture a section which includes a complete continuous 360° ring region of the surface of the empty container.

The plurality of cameras may be arranged in such a way that the section of the surface may be captured simultaneously by means of the plurality of cameras. The image regions, i.e. the images which can be captured in space by the cameras, of the plurality of cameras may at least partly overlap such that there is a redundancy, by means of which it is possible to compensate e.g. pixel errors of the cameras, dirtying of the optical unit or other errors and malfunctions.

According to various embodiments, at least one of the plurality of light sources may include a plurality of light sub-sources.

According to various embodiments, at least one of the plurality of light sources or one or more light sub-sources may be configured to emit light in different spectral regions.

The various spectral regions may be assigned to different functions. By way of example, a first spectral region may be used to identify a first feature of an empty container and a second spectral region may be used to identify a second feature of the empty container. By way of example, white light may be used to increase the lighting level within the capturing region. By way of example, ultraviolet light may also be used for disinfection purposes.

According to various embodiments, the circuit and/or a processor may be configured to control or regulate some of the plurality of light sources and/or some of the plurality of light sub-sources.

By way of example, some of the plurality of light sources/light sub-sources, which are not required for detecting the presence of an empty container, may be deactivated while an empty container is absent so as to reduce the power consumption of the return device for empties. When the presence of an empty container is detected, this portion of the plurality of light sources/light sub-sources may be activated in order to provide a desired lighting level. By way of example, it is also possible to adapt the pulse duration or pulse frequency of one or more light sources.

According to various embodiments, the return device for empties may furthermore include at least one mirror system for displacing the focal plane of at least one camera of the plurality of cameras.

A greater degree of freedom in the selection of the position of the plurality of cameras and of the plurality of light sources may be obtained by displacing the focal plane of one or more cameras by means of one or more mirrors/mirror systems. By way of example, this allows a more compact design of the return device for empties.

According to various embodiments, the processor may be configured to stitch together captured images from the plurality of cameras to form an overall image.

By way of example, a barcode situated on an empty container may be captured in part by one camera and another part thereof may be captured by another camera, and said barcode may only be reconstructed to form the complete barcode in a stitched-together overall image.

According to various embodiments, a return device for empties furthermore includes a transporting system for transporting an empty container, wherein the transporting system and the capturing apparatus are spaced apart from one another.

The distance, for example in the form of a gap between the transporting system and the capturing apparatus, may serve to allow the plurality of cameras to capture the surface of an empty container all the way around, at least in sections, and to prevent the transporting system from blocking the "view" of a camera onto the empty container.

According to various embodiments, the return device for empties may be configured to activate the at least one additional camera of the plurality of cameras and/or the at least one additional light source of the plurality of light sources with a time delay. By way of example, the circuit may be configured to wait a set amount of time in the case of a change in the luminous energy captured by a camera and to check whether the luminous energy remains substantially constant for a time interval such that possible erroneous activations of the at least one additional camera of the plurality of cameras and/or of the at least one additional light source of the plurality of light sources and/or of a processor may be avoided.

According to various embodiments, the return device for empties may be configured in such a way that an empty container is taken back if the modified luminous energy is detected at least in uninterrupted fashion while capturing the features of the empty container.

Hence, it is possible to ensure that the empty container remains in the return device for empties and is not removed and re-inserted, and therefore paid for twice, for example on account of improper behaviour by a user.

According to various embodiments, at least one light source of the plurality of light sources may be actuated to emit light in the form of pulses (by way of example, the circuit may be configured to actuate the light source of the plurality of light sources in such a way that it emits light pulses).

According to various embodiments, the return device for empties may further include at least one reflecting surface which is arranged in such a way that light from at least one light source passes through the capturing region at least twice, before it is captured by a camera.

FIG. 1 schematically shows a return device 100 for empties, for taking back an empty container 118, in accordance with various embodiments. The return device 100 for empties may include a capturing apparatus 102, a capturing region 104 and an electric circuit 116. The empty container 118 may be inserted into the return device 100 for empties and the capturing region 104 situated therein. The capturing apparatus 102 may include at least one camera 106 and a further camera 108, and at least one light source 110 and a further light source 112.

By way of example, the return device 100 for empties may be an automatic machine for taking back one or more types, groups, kinds or categories of empty containers 118. By way of example, an empty container 118 may be a bottle, a tin or any other container, for example for drinkable liquids such as water or beer. By way of example, an empty container 118 may consist of plastic, glass or metal.

The capturing apparatus 102 may include a support, on which a plurality of cameras 106, 108 and a plurality of light sources 110, 112 are held. By way of example, the circuit 116 may likewise be held on the support.

The capturing apparatus 102 may be configured in the form of a horseshoe, wherein the opening may be directed substantially toward the base of the return device for empties.

The horseshoe shape may offer the advantage that at least one light source 110 and at least one camera 106 may be arranged in such a way that there is a direct beam path 114, for example a straight, obstacle-free passage of light through the capturing region 104 from at least one light source 110 to a camera 106 if an empty container 118 is absent.

A plurality of cameras 106, 108, for example five cameras, which may be attached along the horseshoe shape with substantially the same spacing between one another, may be arranged around the capturing region 104, in which one or more features of an empty container 118 may be captured by means of one or more cameras 106, 108. The capturing region 104 may be arranged between a plurality of light sources 110, 112 and a plurality of cameras 106, 108.

An empty container 118 present in the capturing region 104 may deflect or block light incident thereon or in any other way modify the beam path 114 of light from one or more light sources 110, 112 to one or more cameras 106, 108 in the capturing region 104. Hence, at least one of the plurality of cameras 106 may capture a different luminous energy, depending on whether or not an empty container 118 is present in the capturing region 104.

At least one camera 106 and at least one light source (or light sub-source) 110 may be arranged in a pairwise manner in such a way that, in each case, light from the light source 110 reaches a camera 106 along the beam path schematically depicted in FIG. 1, provided that no empty container 118 is present. If an empty container 118 is inserted into the return device 100 for empties and into the capturing region 104 situated therein, the beam path may be interfered with/modified, i.e. one or more cameras 106, 108 may receive a modified luminous energy.

By way of example, a camera of the plurality of cameras 106, 108 may include a CCD (charge-coupled device) chip or a CMOS (complementary metal-oxide semiconductor) sensor. Alternatively, a camera 106, 108 may include any other optical sensor. The plurality of cameras 106, 108 may be the same as one another or different from one another. By way of example, a plurality of cameras 106, 108 which are different from one another may be designed for different spectral regions. The focal plane of one or more cameras 106, 108 may be modified by means of windows, lenses and mirror systems. By way of example, a mirror system may be used to place the focal plane of a camera 106, 108 onto the surface of the empty container 118, wherein the camera 106, 108 may have a distance of less than e.g. 100 cm, for example less than 20 cm, from the empty container 118.

One or more light sources 110, 112, or a plurality of light sub-sources thereof, may, for example, include one or more halogen lights and/or LEDs. By way of example, a light source 110, 112 may be configured to emit light such that a sufficient lighting level is available for the plurality of cameras 106, 108. A light source/light sub-source 110, 112 may emit light which serves to identify the presence of an empty container 118 by means of the circuit 116 and the plurality of cameras 106, 108. Ostensively, a light source may consequently satisfy a twin function or multiple function.

By way of example, a light source 110, 112 may include mirrors, lenses or windows such that light is e.g. directed to one camera 106, 108 or that the light is diffusely distributed for a general lighting level.

The circuit 116 may be electrically connected to the plurality of cameras 106, 108. The circuit 116 may have an analogue or digital embodiment and may include one or more dedicated processors and microcontrollers. The circuit 116 may also be part of a processor. Ostensively, the circuit 116 may act as an optical sensor in conjunction with one or more cameras 106 and one or more light sources 110. Hence, it is possible to detect whether an empty container 118 has been introduced into the capturing region 104, with no further systems, for example an additional photoelectric barrier or scales, being required. However, in alternative embodiments, it is possible to add an additional photoelectric barrier or scales to the return device 100 for empties, for example in order to increase the reliability and error tolerance.

The circuit 116 may be connected to the plurality of cameras 106, 108 and may be configured to activate or deactivate at least one additional camera 108 of the plurality of cameras 106, 108 and/or at least one additional light source 112 of the plurality of light sources 110, 112 on the basis of the luminous energy captured by means of at least one camera 106. By way of example, activating or deactivating may mean, inter alia, that the at least one light source 112 and/or the at least one camera 106 are switched on/off or that, in the case of a pulsating behaviour, the pulse frequency and/or pulse duration is/are increased/reduced.

With the aid of the circuit 116, it is possible to detect a change in the luminous energy if an empty container 118 is inserted into the capturing region 104. The circuit 116 may be configured to at least partly activate one or more additional light sources/light sub-sources 112 and/or one or more additional cameras 108 and a processor in the case of a change in the luminous energy. The circuit 116 may also be configured only to at least partly activate the processor, one or more additional light sources/light sub-sources 112 and/or one or more additional cameras 108 if a modified luminous energy is present for a certain time duration, in order to avoid erroneous actuations.

A processor may be connected to the plurality of cameras 106, 108 such that the images (or image data) captured by the plurality of cameras 106, 108 may be supplied electronically to the processor. The processor may be configured to examine the image data from the plurality of cameras 106, 108 in respect of identification features of the empty container 118 by means of appropriate hardware and software.

If the presence of the empty container 118 is identified and the one or more features thereof were captured, the empty container 118 may be moved on, for example by means of a transporting system. If there is no capture of the one or more features of the empty container 118 or if capturing the one or more features is not possible, the transporting system is able to (at least partly) eject the empty container again through an opening in the return device 100 for empties, i.e. the empty container 118 may be rejected. Rejection may also take place if one or more features of the empty container 118 were captured but, for example, the return device 100 for empties was informed that a storage space is full.

By way of example, the processor may be part of further circuitry, for example part of a computer system or for example part of a microcontroller. The processor may be connected to a memory or a database. The memory may contain data about one or more known features of empty containers or a plurality of known linked features such that the processor is able to compare the one or more features captured by means of the plurality of cameras 106, 108.

The processor may be configured in such a way that the latter may be wholly or partly activated, deactivated or, for example, placed into a sleep mode, for example a standby mode. By way of example, activation or deactivation may mean, inter alia, that software running on the processor is read from a memory and executed, or terminated. The processor may be completely activated by means of the circuit 116 if an empty container 118 is situated in the capturing region 104 of the return device 100 for empties.

As a result of being able to completely activate the processor and, additionally, one or more light sources/light sub-sources 112 and, additionally, one or more cameras 108 when an empty container 118 is introduced into the capturing region 104 of the return device 100 for empties, it is possible, for example, to prevent improper behaviour. By way of example, it is possible to prevent an empty container 118 from being introduced into the return device 100 for empties, immediately being removed again after the capture of the features of the empty container 118 was carried out and being introduced again since successful taking back of an empty container 118 may be based on both successful capture of features and a presence of the empty container 118 in the capturing region 104 during the capturing process and therebeyond.

FIG. 2 shows a schematic view of a capturing apparatus 200 for capturing one or more features of an empty container 202. The capturing apparatus 200 may include a support, on which a plurality of camera systems 204, 206 and a plurality of light source systems 208, 210 may be held. A camera system 204, 206 may include one or more cameras, a holder and one or more mirror systems for capturing one or more features of the empty container 202. One or more mirror systems may be assigned to one or more camera systems 204, 206 in such a way in each case that a focal plane of the one or more cameras 204, 206 is situated e.g. on the surface of the empty container 202, or in the vicinity thereof, wherein the distance between the cameras 204, 206 and the empty container 202 may be kept small. By way of example, different camera systems 204, 206 along a horseshoe shape may have different mirror systems.

A light source system 208, 210 may include one or more light sources/light sub-sources, a holder and one or more mirror systems.

By way of example, two camera systems 204 and two light systems 208, with one camera system 204 respectively being assigned to one light system 208, may act as an optical sensor for identifying the presence of the empty container 202 by means of a circuit. Ostensively, the right-hand light source system 208 and the left-hand camera system 204, within the meaning of the figure, and the left-hand light source system 208 and the right-hand camera system 204 may act as two photoelectric barriers. As soon as the presence of the empty container 202 was identified, the circuit may be configured to at least partly activate additional light source systems 210 and/or additional camera systems 206.

FIG. 3A shows a schematic procedure 300 of a method carried out by the return device for empties within the scope of returning an empty container.

In 302, a check is carried out, i.e. it captures, whether an empty container has been inserted into a capturing region of a return device for empties. The return device for empties may include a plurality of cameras and a plurality of light sources. The check may be based upon the fact that, if an empty container is present in the capturing region, a different quantity of light, which is emitted by at least one light source, reaches at least one camera than in the case in which there is no empty container in the capturing region. This check may be carried out until the presence of an empty container is identified.

In the case where the presence of an empty container has been identified, an additional one or more light sources/light sub-sources and/or an additional one or more cameras may be activated in 304. A processor may likewise be activated. The processor may also be permanently active and not activated on account of the presence of an empty container.

The processor may be electrically connected to the plurality of cameras and may receive image data from the plurality of cameras. In 306, the processor may examine the image data from the cameras in respect of one or more known features of an empty container, for example features that are linked to one another as well.

If ascertaining one or more features of the empty container ends up "positive", i.e. if the empty container is accepted or if the type, kind or category thereof is identified as type of empties anticipated to be taken back, the empty container may, in 308, be transported by means of a transporting device, for example into a storage space or to a sorting region, for example to a sorting table, for example a bottle table, or else to a compactor.

If identification of the features of an empty container ends up "negative", i.e. the empty container is not accepted or the type, kind or category thereof is not identified as a type of empties anticipated to be taken back, or if the empty container was identified as being damaged, it is possible, in 310, for the empty container to be transported out of the return device for empties again, for example by means of a transporting device.

After the transporting processes of the empty container is complete, the additional one or more light sources/light sub-sources and/or the additional one or more cameras and, for example, the processor as well may be deactivated in 312 and the return device for empties may then carry out the method again, starting at 302.

FIG. 3B shows a schematic procedure 320 of a further method carried out by the return device for empties within the scope of returning an empty container.

FIG. 3B differs from FIG. 3A in that checking for the presence of an empty container is carried out not only in a first process 302, but instead, as described in 322, it is carried out permanently.

That is to say, if an empty container is inserted into the return device for empties and the presence thereof is captured in the capturing region, the additional one or more light sources/light sub-sources and/or the additional one or more cameras and, for example, the processor as well may be activated in 324. In 326, ascertaining one or more features of the empty container may be carried out by means of the processor. Analogous to 308 and 310 in FIG. 3A, the empty container may be transported accordingly in 328 and 330, depending on the positive or negative result of ascertaining the features of the empty container, and the additional one or more light sources/light sub-sources and/or the additional one or more cameras and, for example, the processor as well may be subsequently deactivated in 332.

If the check in respect of the presence of the empty container is negative or becomes negative while the method in 324, 326, 328 and 330 is carried out, the method may be continued directly in 332 and the additional one or more light sources/light sub-sources and/or the additional one or more cameras and, for example, the processor as well may be deactivated. Alternatively, or additionally, the procedure may be judged to be complete, and so a new insertion of the empty container is judged to be a new process.

In alternative embodiments, a predetermined period of time may initially be allowed to elapse before the additional one or more light sources/light sub-sources and/or the at least one or more cameras and, for example, the processor as well are deactivated in the case of a negative check in respect of the presence of an empty container in 324, 326, 328, 330.

Figure 4:
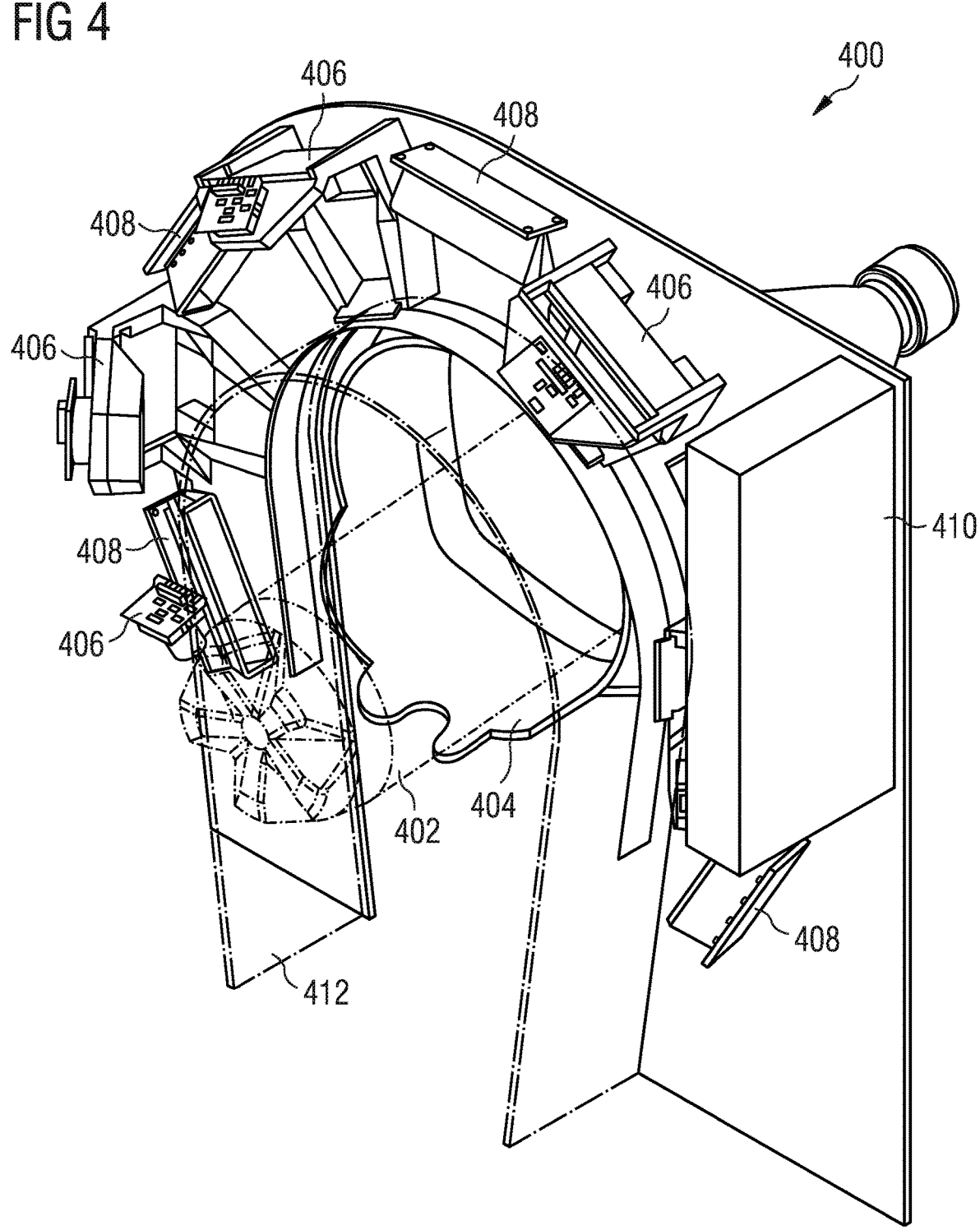
FIG. 4 shows a view of a capturing apparatus in accordance with various embodiments.

FIG. 4 shows a view of a capturing apparatus 400. An empty container 402, an opening 404, a plurality of camera systems 406, a plurality of light source systems 408 and a circuitry unit 410 are provided with reference signs. Furthermore, a protecting element 412 is depicted.

The protecting element 412 may have one or more functions. On the one hand, the protecting element 412 may serve to protect parts of the capturing apparatus 400, for example the sensitive optical unit of the (plurality of) camera systems 406, from mechanical action by the empty container 402. The protecting element 412 may also serve to guide the empty container 402 during the insertion into a return device for empties or to protect the capturing apparatus 400 from dirt or liquid.

The protecting element 412 may be transparent such that the plurality of camera systems 406 may capture the light from the plurality of light source systems 408 through the protecting element 412 and thus may identify the presence of the empty container 402 and capture the one or more features thereof.

The circuitry unit 410 may be connected to various elements of the capturing apparatus 400. It may include one or more items of circuitry and/or processors and may provide a plurality of functions. By way of example, the circuitry unit 410 may be configured to receive image data or video data from the plurality of camera systems 406 and to forward these to a processor. The circuitry unit 410 may be configured in such a way that data are buffer stored, processed/pre-processed and/or wholly or partly forwarded by means of a communication protocol (for example TCP/IP). Further, the circuitry unit 410 may be configured to control or regulate the plurality of camera systems 406 and/or the plurality of light source systems 408. By way of example, the circuitry unit 410 may include a circuit which activates one or more camera systems 406 and/or one or more light source systems 408 as soon as the presence of an empty container 402 was identified.

FIG. 5A shows a schematic view of a camera system.

The camera system 500 may include a camera 502. The image region captured by the camera 502 or light which reaches the camera 502 may be deflected by means of a first mirror 506 and a second mirror 508. The camera system 500 may include a lighting unit 504. A beam path 512 may lead from an empty container or a light source to the second mirror 508 and a beam path 510 may lead from the second mirror to the first mirror 506 and, from there, into the camera 502.

The first mirror 506 and the second mirror 508 may enable the focal plane of the camera 502 to lie on the surface of an empty container, wherein the spatial distance between the empty container and the camera 502 or the camera system 500 may be kept small.

The lighting unit 504 may be configured to supply a desired lighting level for recording an image with the camera 502. The lighting unit may act as a light source, for example with a plurality of light sub-sources.

FIG. 5B shows a schematic view of a camera system 550.

The camera system 550 includes a camera 514, a holder 516, a first mirror 518 and a second mirror 520.

The holder 516 may be configured to hold the camera 514 in such a way that the camera may be modified in terms of the position thereof, for example be adjusted.

FIG. 5C shows a further schematic view of the camera system 550.

In addition to FIG. 5A, the beam path 526 from the camera 514 to the second mirror 520, the beam path 524 from the second mirror 520 to the first mirror 518 and the two beam paths 528, 530 from the first mirror 518 to e.g. a light source or an empty container are depicted. As schematically illustrated by the subdivision into the beam path 528 and the beam path 530, the camera 514 and the two mirrors 518, 520 may be designed in such a way that not every beam path leads over both mirrors but, for example, only over one mirror.

The beam paths 528, 530, 524 and 516 cross one another (with spatial superposition) in this example. As a result, it is possible to displace the focal plane of the camera 514 which, for example facilitates reducing the spatial distance between the camera 514 and an empty container (to be captured in focus) and thus facilitates a compact design of a capturing apparatus.

Figure 6:
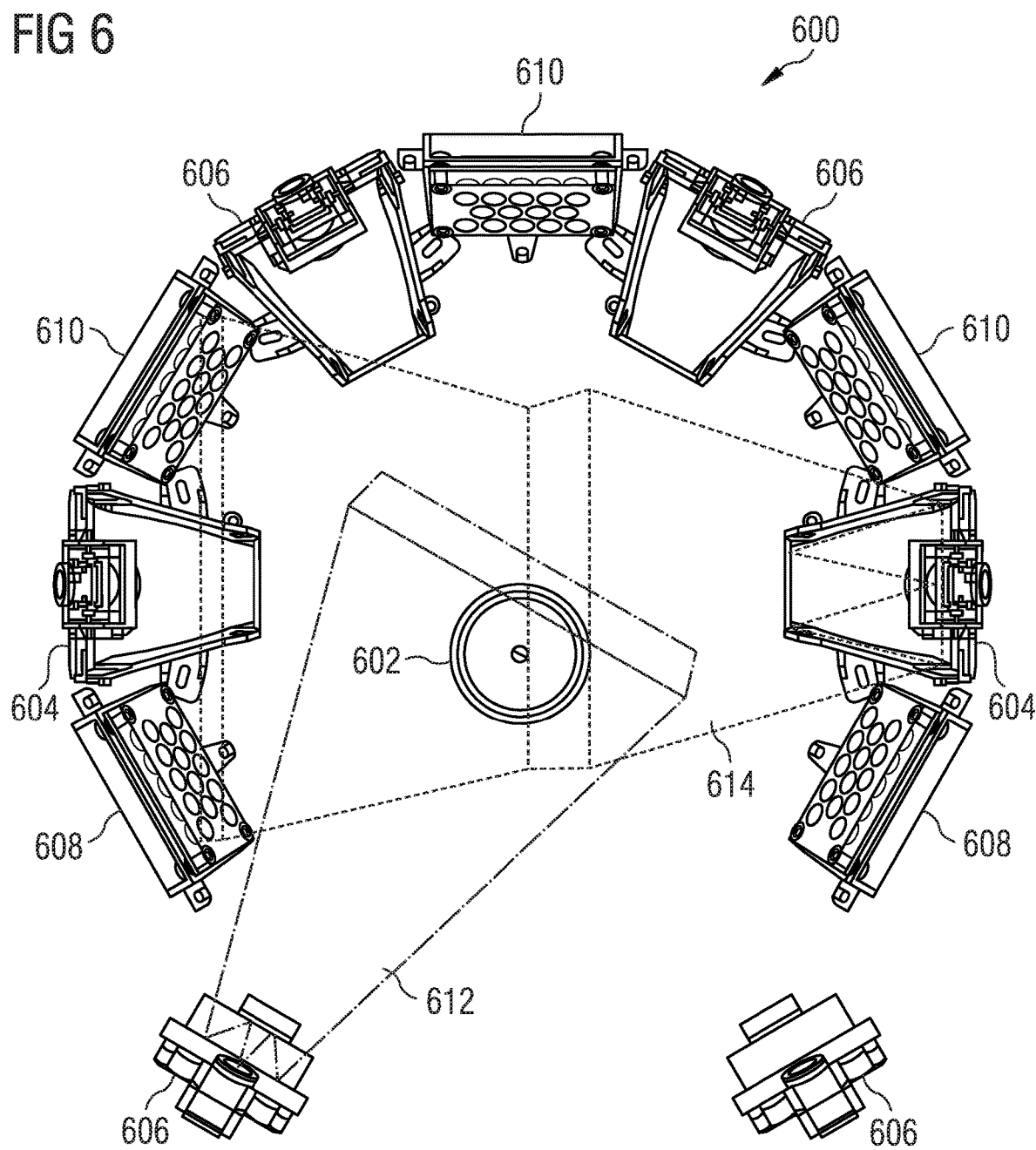
FIG. 6 shows a view of a capturing apparatus in accordance with various embodiments.

FIG. 6 shows a view of a capturing apparatus 600 in accordance with various embodiments for capturing one or more features of an empty container 602.

The capturing apparatus 600 may include a support, on which a plurality of camera systems 604, 606 and a plurality of light source systems 608, 610 may be held.

A camera system 604, 606 may include one or more cameras, a holder and one or more mirror systems for capturing one or more features of the empty container 602. One or more mirror systems may be assigned to one or more camera systems 604, 606 in such a way in each case that a focal plane of the one or more cameras 604, 606 is situated on e.g. the surface of the empty container 602, or in the vicinity thereof, wherein the distance between the cameras 604, 606 and the empty container 602 may be kept small. By way of example, different camera systems 604, 606 along a horseshoe shape may include different mirror systems.

The capturing apparatus 600 may correspond to the capturing apparatus 200 from FIG. 2, with the two beam paths 612 and 614 being depicted schematically. The horseshoe-shaped arrangement of the plurality of light source systems 608, 610 and of the plurality of camera systems 604, 606 may be such that a section of the surface of an empty container may be simultaneously captured in the entirety thereof in the capturing region which, for example, runs through 360° about the surface of the empty container.

Figure 7:
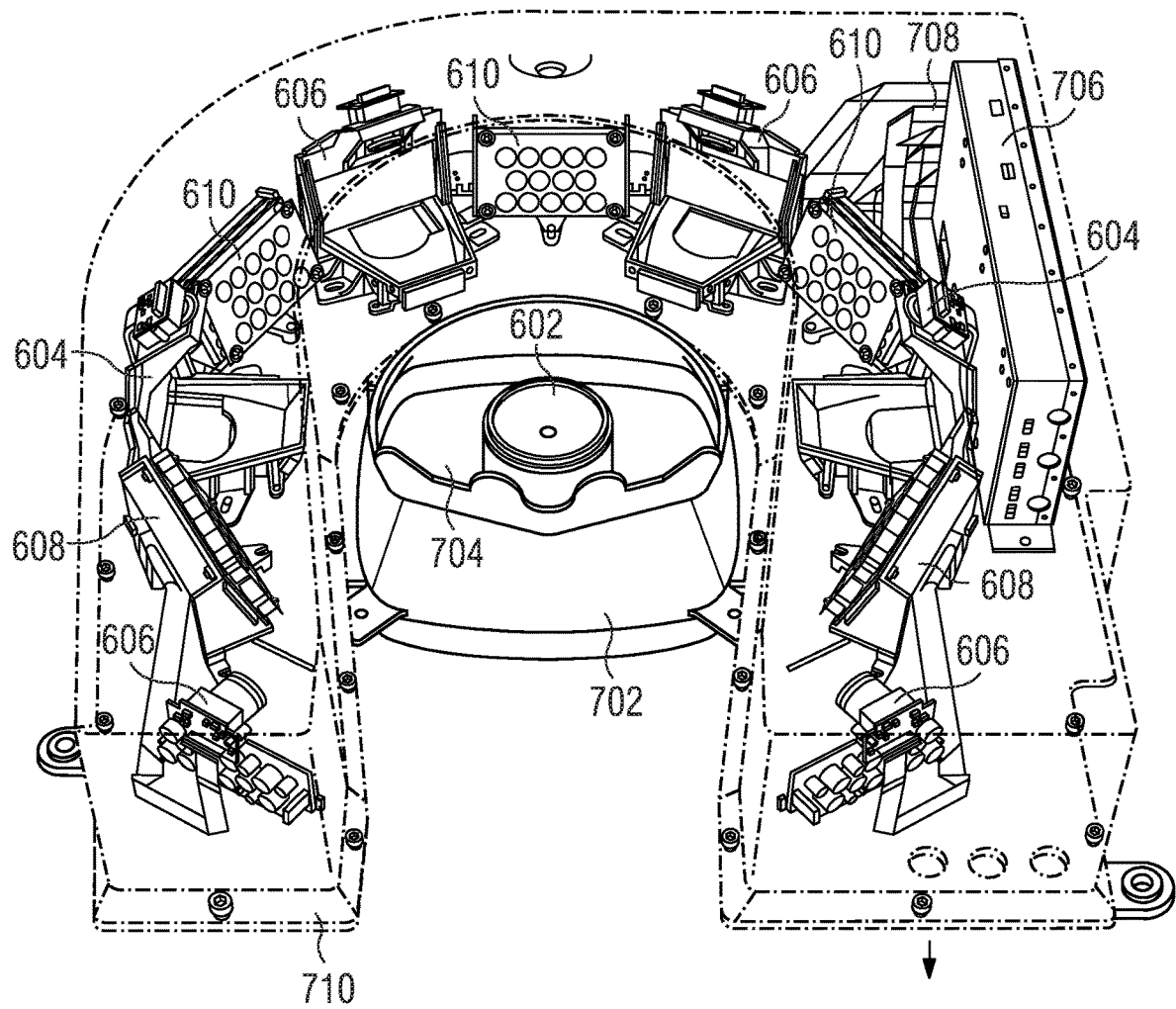
FIG. 7 shows a further view of a capturing apparatus in accordance with various embodiments.

FIG. 7 shows a further view of a capturing apparatus 600 in accordance with various embodiments for capturing one or more features of an empty container 602.

In addition to the illustration in FIG. 6, FIG. 7 shows an insertion device 702, an opening 704, a circuitry unit 706, a plurality of electrical connections 708 and a cover 710.

The empty container 602 may be inserted into a capturing region of the capturing apparatus 600 through the opening 704 in the capturing apparatus 600 (or in the return device for empties). The insertion device 702 may be designed in such a way in the process that a lying surface is provided for the empty container 602, said lying surface, on account of the shape thereof, being able to serve to bring the empty container 602 into a desired position, for example centred in the capturing region.

The circuitry unit 706 may be connected to various elements of the capturing apparatus 600 by means of a plurality of electrical connections 708. The circuitry unit 706 may be configured to send and receive data. The circuitry unit 706 may be configured to control or regulate the plurality of camera systems 604, 606 and/or the plurality of light source systems 608, 610, or the plurality of light sources/light sub-sources contained therein, and a plurality of cameras. By way of example, the circuitry unit 706 may include a circuit which, together with the two camera systems 604 and the two light source systems 608, represents an optical sensor for identifying the presence of the empty container 602. If the presence of the empty container 602 has been identified, the circuit may activate a further one or more camera systems 606 and/or a further one or more light source systems 610.

The cover 710 may be configured to protect the capturing apparatus 600, for example from mechanical action, dirt, liquid or other impairments. The cover 710 may have openings in order to facilitate cooling/ventilating of the capturing apparatus 600 or parts thereof. The cover 710 may include both transparent regions and non-transparent regions and, for example, include a plurality of partial covers. By way of example, a transparent protecting element may be part of the cover.

FIG. 8A shows a schematic view of a light source system 800.

The light source system 800 may include a light source with a plurality of light sub-sources 802, 804. The light source system 800 may include a reflector 806. A window 808 may be arranged on the reflector 806. The light source system 800 may further include a holder 810.

The plurality of light sub-sources 802, 804 may be configured to increase the lighting level within a capturing region and thus facilitate e.g. capturing features of an empty container by the plurality of cameras. The subdivision into a plurality of light sub-sources 802, 804 may aid the reliability of the entire light source since an outage of a light sub-source 802, 804 does not mean a complete outage of the light source and hence of the capturing apparatus 200. The plurality of light sub-sources 802, 804 may be directed differently and have different emission characteristics. Thus, for example, a group of light sub-sources 802, 804 may be directed directly onto an empty container while a further group of light sub-sources 802, 804 may illuminate the empty container and the surroundings thereof, for example in a diffuse manner.

By way of example, the plurality of light sub-sources 802, 804 may be configured in such a way that a first group of light sub-sources 802 emits light in a directed manner onto one or more cameras such that an optical sensor for identifying the presence of an empty container is realized by means of the one or more cameras, circuitry and the first group of light sub-sources 802. Further, a second group of light sub-sources 804 may be configured to emit light in an at least partly nonvisible spectral region, for example ultraviolet light or infrared light. By way of example, one or more features of an empty container may be able to be captured only, or captured in an improved manner, using nonvisible light and one or more cameras suitable to this end. A third group of light sub-sources may be configured to illuminate the surroundings of the empty container and the empty container. The entire lighting level may be increased by means of such an illumination of the surroundings, which may be advantageous for the contrast value captured by the one or more cameras. Different groups of light sub-sources 802, 804 may satisfy the same function.

The window 808 and the reflector 806 may be configured, on the one hand, to protect the light source or associated electronic components and circuitry of the light source and, on the other hand, to design the beam path of the light source, for example to direct said beam path and suppress emission in an unwanted direction.

The light source or, for example, one or more groups of light sub-sources 802, 804 may be configured to produce pulsed light. Ostensibly, the pulses may act as a "flash" for a plurality of cameras for recording respectively one image. By way of example, a circuit and/or a processor may be configured to synchronize the pulsation and the recording of a plurality of images in time.

FIG. 8B shows a schematic view of a light source system 850.

The light source system 850 may include a cover 852, a holder 854 and circuitry 856.

The holder 854 may serve to fasten the light source system 850 to a support. The circuitry 856 may supply one or more light sources/light sub-sources with power and control and/or regulate the latter, for example depending on received control signals.

The cover 852 may include a plurality of openings or transparent regions in order to facilitate light emission into the capturing region by a plurality of light sources/light sub-sources. By way of example, the cover 852 may be a polarization filter or include a plurality of polarization filters.

FIG. 8C shows a further schematic view of a light source system 850.

This view does not show the cover 852 in order to facilitate a view of a light sub-source 860, for example an LED, and a lens 858 assigned to the light sub-source 860.

Figure 9A:
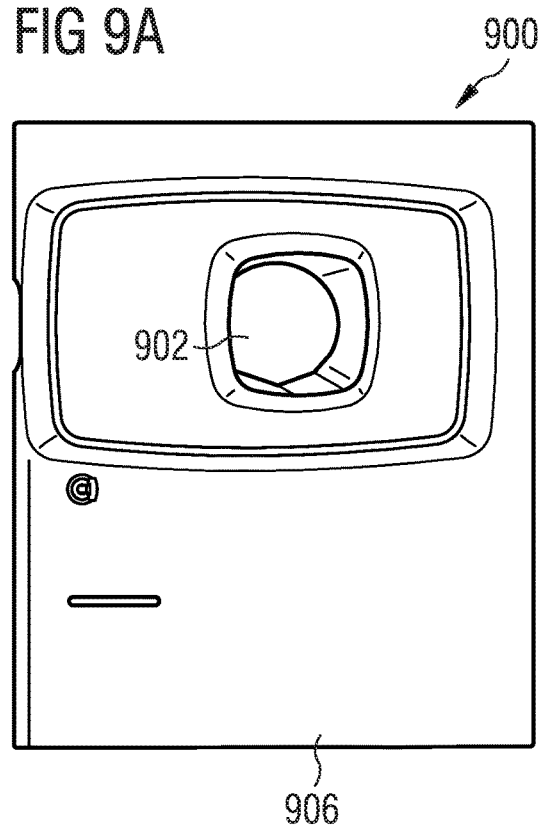
FIGS. 9A and 9B show views of the front of a return device for empties.

FIG. 9A shows a schematic view of a front side of the front of a return device 900 for empties.

The front side of the front side cover 900 of the return device for empties may include an opening 902, through which an empty container may be brought into a capturing region, and a front door 906.

Figure 9B:
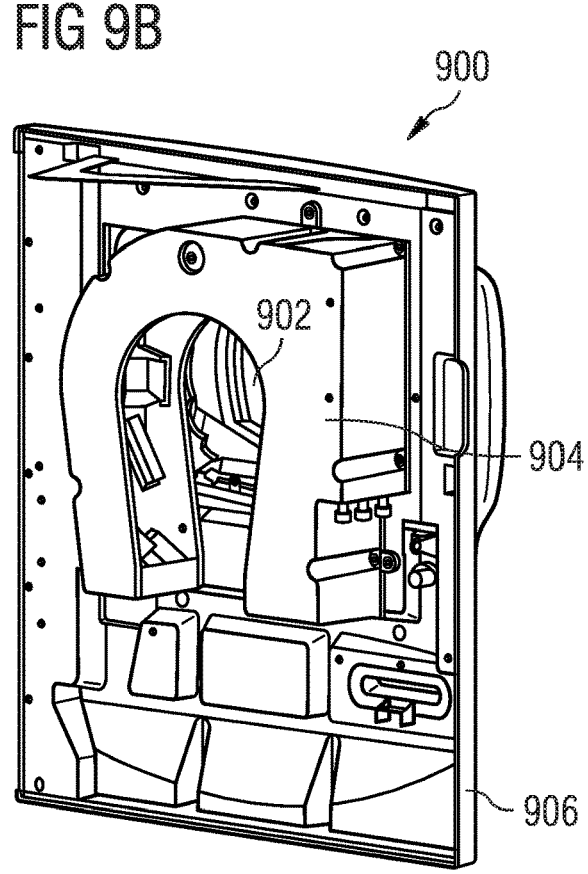

FIG. 9B shows a schematic view of a rear side of the front side cover 900 of the return device for empties.

On the inner side, the front door 906 may be designed in such a way that the capturing apparatus 904 may be fastened to the front door 906. Hence, the capturing apparatus 904 may be easily serviced when the front door 906 is opened, without it being necessary to remove other parts of the return device 900 for empties. Ostensibly, the horseshoe-shaped capturing apparatus (for example, the capturing apparatus from FIG. 7) is therefore arranged around the opening 902, with the open side of the horseshoe shape being directed toward the base of the front door.

FIG. 10 schematically shows part of a return device 1000 for empties.

The return device 1000 for empties may include a capturing apparatus 1002 (for example, the capturing apparatus from FIG. 7) and a transporting system (for example, a transporting apparatus) 1004. An empty container 1006 may be inserted through the opening (for example, the opening 902) into the return device 1000 for empties in such a way that the empty container 1006 may be at least partly inserted into the capturing region 1008 of the capturing apparatus 1002. The transporting system 1004, which is separated from the capturing apparatus 1002 by means of a gap 1010, may include two transporting belts 1012 which are inclined toward one another at an acute angle.

By way of example, on account of the gap 1010 between the transporting system 1004 and the capturing apparatus 1002, the light from a light source may remain unblocked, at least in part, and facilitates that, for example, a section of the surface of the empty container 1006, which runs around the empty container 1006, may be captured in the entirety thereof by means of a plurality of cameras.

As shown here, the capturing region 1008 may be smaller than an empty container 1006, at least in one dimension. By way of example, since the image data of a plurality of cameras of the capturing apparatus 1002 may be stored by means of a memory and the image data may be stitched together to form an image (or a video image sequence) by means of a processor, it is possible, by means of the processor, to calculate stitched-together image data which represent the entire surface of the empty container 1006.

Figure 11:
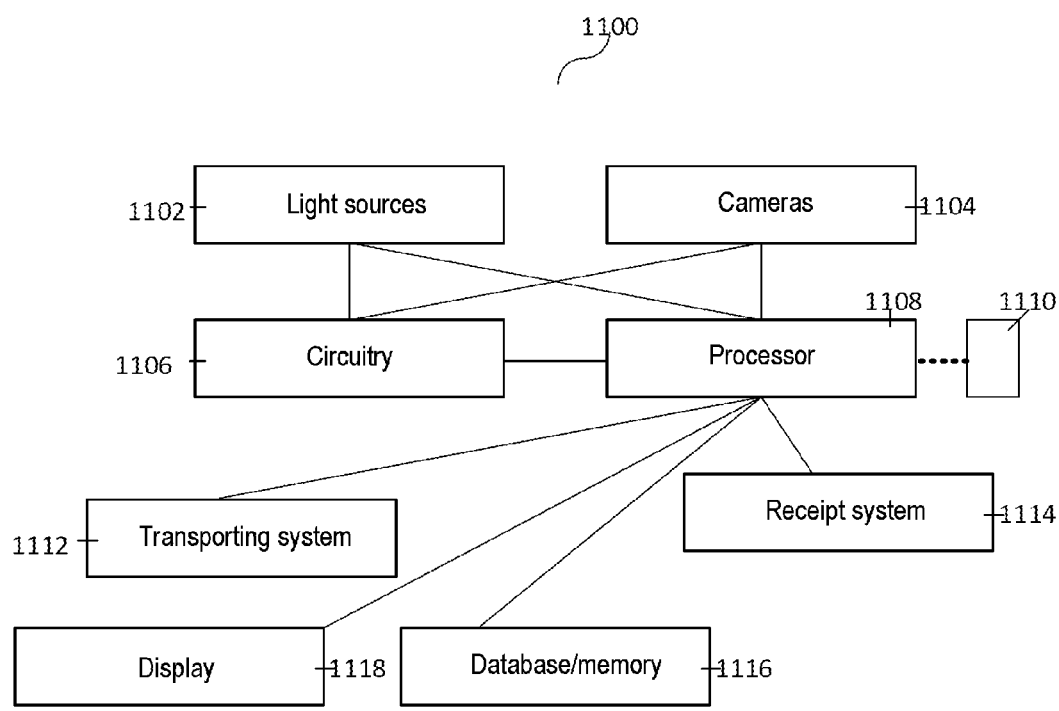
FIG. 11 shows a block diagram of a return device for empties.

FIG. 11 shows a block diagram 1100 of part of a return device for empties.

The return device for empties may include a plurality of light sources 1102, a plurality of cameras 1104, circuitry 1106, a processor 1108, a transporting system 1112, a deposit receipt system 1114, a display 1118 and a database or memory 1116. Furthermore, the processor 1108 may be connected to another device 1110 external to the return device for empties, for example by means of a communication network, for example by means of a computer network.

According to various embodiments, the circuitry 1106 and/or the processor 1108 may be configured to control the plurality of light sources 1102 and/or the plurality of cameras 1104. By way of example, the illuminance of the plurality of light sources may be matched to the plurality of cameras 1104 in such a way that there is sufficient brightness or contrast of the images captured by the plurality of cameras 1104. It is also possible to set different lighting levels for the cases where an empty container was or was not detected in the return device for empties.

At least one light source of the plurality of light sources 1102 and at least one camera of the plurality of cameras 1104 may form an optical sensor with the circuitry 1106, said optical sensor being able to detect the presence of an empty container. If the presence of an empty container is detected, it is possible to activate at least one further light source of the plurality of light sources 1102 and/or at least one additional camera of the plurality of cameras 1104. Further, the processor 1108 or parts of the processor 1108 may be activated, for example switched from a standby mode into an active mode. By means of the at least one additional light source, the at least one additional camera and the processor 1108, the return device for empties may be configured to capture one or more identifying features of an empty container.

The processor 1108 may be configured to receive image data from one or more cameras 1104. On the basis of the image data, the processor 1108 may be configured to compare features of an empty container with, for example, one or more features, e.g. also linked features, which are stored in a database or a memory 1116.

Depending on whether an empty container was captured by the processor 1108, the transporting system 1112 may be instructed by means of the processor 1108 to transport the empty container out of the capturing region of the plurality of cameras 1104, for example into a storage space. If an empty container, or the type, kind or category thereof, was not captured or captured as being unsuitable, the transporting system 1112 may be instructed to transport the empty container out of the return device for empties again.

Depending on whether the processor 1108 has captured, or not captured, an empty container, or the type, kind or category thereof, i.e. depending on whether the processor has determined a status for the empty container, the processor 1108 may be configured to indicate the respective status by means of a display 1118. By way of example, the display 1118 may be a monitor and/or else a lamp, which reproduces the status by means of a colour code.

The processor 1108 may be configured to store a history of inserted empty containers, for example in a database or a memory 1116.

By means of a deposit receipt system 1114, the processor 1108 may be configured to calculate and sum a deposit of returned empty containers and hence calculate a deposit for all empty containers inserted into the return device for empties by a user within the scope of a taking-back process. The deposit receipt system 1114 may be realized by means of the processor 1108, at least in part. The deposit receipt system 1114 may be configured to print out a deposit coupon, for example upon demand by a user, which specifies the ascertained deposit.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A return device for empties, comprising:
    an optical capturing apparatus configured to optically capture features of an empty container, the capturing apparatus comprising:
        a plurality of light sources;
        a plurality of cameras; and
        a circuit connected to the plurality of cameras;
            wherein the light sources and the cameras are arranged around a capturing region in a horseshoe-shaped manner, with the empty container being brought into said capturing region for the purposes of optically capturing the features;
            wherein at least one of the plurality of light sources and at least one of the plurality of cameras are arranged in such a way that the at least one camera is arranged in the beam path of the at least one light source such that, when an empty container has been brought into the capturing region, the at least one camera captures a modified luminous energy from the at least one light source compared to the case where there are no empty containers in the capturing region;
            wherein the circuit connected to the plurality of cameras is configured to activate at least one additional camera of the plurality of cameras or at least one additional light source of the plurality of light sources on the basis of the luminous energy captured by the at least one camera; and
            wherein the return device for empties is configured in such a way that an empty container is taken back if the modified luminous energy is detected at least in uninterrupted fashion while capturing the features of the empty container.

2. The return device for empties of claim 1, further comprising: a processor configured to process image signals captured by the plurality of cameras.

3. The return device for empties of claim 2, wherein the return device for empties is configured to activate the processor on the basis of the modified luminous energy captured by means of the at least one camera of the plurality of cameras.

4. The return device for empties of claim 1, wherein the plurality of cameras are configured to capture a continuous 360° ring region of the surface of the empty container.

5. The return device for empties of claim 1, wherein at least one of the plurality of light sources comprises a plurality of light sub-sources.

6. The return device for empties of claim 5, wherein the plurality of light sub-sources are configured to emit light in different spectral regions.

7. The return device for empties of claim 1, wherein at least one of the circuit or a processor are configured to control or regulate at least one of the plurality of light sources or at least one of a plurality of light sub-sources.

8. The return device for empties of claim 1, further comprising:
    at least one mirror system configured to displace a focal plane of at least one camera of the plurality of cameras.

9. The return device for empties of claim 1, wherein a processor is configured to stitch together captured images from the plurality of cameras to form an overall image.

10. The return device for empties of claim 1, further comprising:
    a transporting system configured to transport an empty container wherein the transporting system and the capturing apparatus are spaced apart from one another.

11. The return device for empties of claim 1, wherein the return device for empties is configured to activate at least one additional camera of the plurality of cameras or at least one additional light source of the plurality of light sources with a time delay.

12. The return device for empties of claim 1, wherein the circuit is configured to actuate the at least one light source of the plurality of light sources in such a way that it emits light in the form of pulses.

13. The return device for empties of claim 1, further comprising:
    at least one reflecting surface which is arranged in such a way that light from at least one light source passes through the capturing region at least twice; before it is captured by a camera.

14. The return device for empties of claim 1, wherein a photoelectric barrier is formed by at least one light source and the at least one camera that is in the beam path of the at least one light source and that captures the modified luminous energy.

* * * * *